Sept. 8, 1942.  E. C. WHITNEY  2,295,314
SET SCREW
Filed May 4, 1940
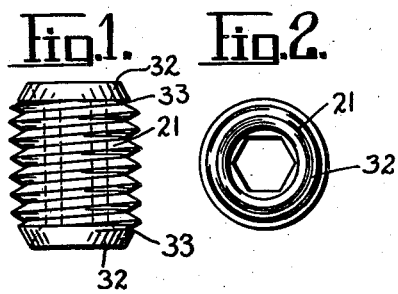
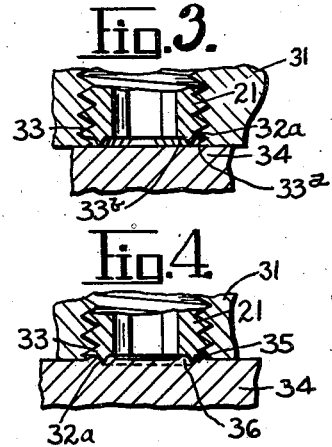
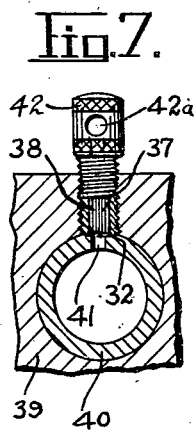
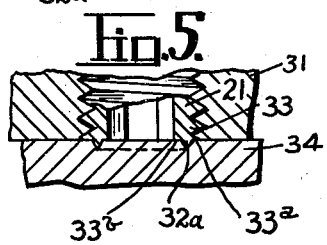
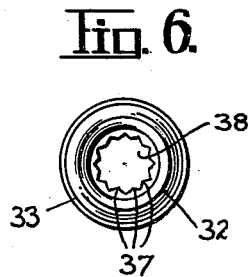
INVENTOR
*Ernest C. Whitney.*
BY
*H. G. Manning*
ATTORNEY Patented Sept. 8, 1942

2,295,314

UNITED STATES PATENT OFFICE 2,295,314

SETSCREW

Ernest C. Whitney, Waterbury, Conn.

Application May 4, 1940, Serial No. 333,398

3 Claims. (Cl. 85—1)

This invention relates to improvements in set screws, and more particularly to a hollow set screw adapted to be driven by an operating tool into tapped holes.

One object of this invention is to provide an improved set screw of the above nature which will be relatively inexpensive to manufacture, simple in construction, compact, and very efficient and durable in use.

With these and other objects in view, which will appear as the description proceeds, there have been illustrated in the accompanying drawing three forms in which the invention may be conveniently embodied in practice.

In the drawing:

Fig. 1 is an enlarged side view of the first improved form of hollow set screw.

Fig. 2 is a top plan view of the same.

Figs. 3, 4 and 5 are views showing a modified form of set screw as it appears when being driven through a tapped collar and against the periphery of a cylindrical shaft.

Fig. 6 is a bottom view of another modified form of set screw also embodying the invention.

Fig. 7 is a sectional view showing a hollow set screw employed for holding a shaft bushing in position and having an oiler associated therewith for lubricating said shaft through said set screw.

Referring now to the drawing wherein like reference numerals designate like parts throughout the several views, The hollow set screw 21 has a hexagonal bore and is provided at both ends 33 with longitudinally projecting circular ribs 32 which are V-shaped in cross-section and having the sharp edges of said ribs substantially centered between the outer and inner periphery of the set screw 21.

In the modified form shown in Figs. 3 to 5, provision is made of a flat outer rim 33a and a flat inner rim 33b so that when the V-shaped rib 32a (which is made smaller in this instance) is caused to bite into the surface of a shaft 34 or other article against which the set screw is driven, no burr will be left on the article 34 or shaft whereby it may be easily withdrawn from the surface of said shaft or other article engaged thereby. The action of the rib 32a when striking the surface of the shaft 34 is clearly shown in Figs. 3, 4 and 5, where it will be seen that the rotating rib 32a will first bite into this surface, throwing up annular burrs or ridges 35 and 36, one inside and one outside of the circular rib 32a. These burrs or ridges 35 and 36 will be subsequently smoothed out by the flat outer and inner rims 33a and 33b of the set screw when it is finally driven "home," as shown in Fig. 5.

The modified form of set screw shown in Fig. 6 differs from the first form in that, instead of having its bore 38 hexagonal, twelve V-shaped ribs 37 will be formed therein—this number of ribs being a multiple of the number of edges on the hexagonal rod 18.

In Fig. 7 a set screw of the form shown in Fig. 6 is shown screwed into a shaft-holding member 39 for engaging a bushing 40 to hold it securely in position. The bushing 40 is provided with an oil hole 41 which is in alinement with the bore 38 of the set screw. Provision is also made of a hollow oiler cap 42 which is screwed into the member 39 and has a side aperture 42a to permit the shaft to be lubricated through the set screw, thus avoiding the necessity of providing additional lubricating means therefor.

One advantage of the improved type of set screws herein disclosed is that both ends of said set screws are made identical in shape, so that said set screws may be picked up without visual inspection and screwed into a tapped hole—it being immaterial which end is inserted first therein. This construction greatly facilitates the installation of set screws, and is of particular importance in mass production where large numbers of set screws must be screwed into tapped holes in machines and other manufactured articles.

While there have been disclosed in this specification several forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new and for which it is desired to obtain Letters Patent is:

1. A set screw comprising a hollow exteriorly threaded cylindrical member, an integral annular rib extending from one end face of said member, generally V-shaped in cross-section, with the point of said rib substantially centered between the bore of said member and its external periphery, and flat rims on said end face located adjacent said rib on the inside and outside thereof to flatten down the burr raised from the surface of the article engaged by said set screw said member having a non-circular hole extending throughout the length thereof for receiving a driving tool.

2. A set screw comprising a hollow exteriorly threaded cylindrical member provided with an interior hole of uniform non-circular shape extending throughout the length thereof for receiving a driving tool of corresponding shape fitted therein, whereby the rotation of said tool will cause said set screw to be screwed into a tapped hole, said set screw having ends of identical shape provided with integral means to bite into a shaft or other member engaged by said set screw, whereby said set screw may be picked up without visual inspection and have either end thereof inserted into said tapped hole with equal efficiency.

3. A set screw comprising a hollow exteriorly threaded cylindrical member provided with a serrated hole extending the entire length thereof for receiving a driving member shaped to interlock with the serrations of said hole, said set screw having on each end an integral annular rib of V-shaped cross-section adapted to bite into a shaft or other member engaged by said set screw.

ERNEST C. WHITNEY.